(12) United States Patent
Harvell

(10) Patent No.: US 6,834,302 B1
(45) Date of Patent: Dec. 21, 2004

(54) DYNAMIC TOPOLOGY NOTIFICATION EXTENSIONS FOR THE DOMAIN NAME SYSTEM

(75) Inventor: Joseph C. Harvell, Dallas, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/224,376

(22) Filed: Dec. 31, 1998

(51) Int. Cl.$^7$ .................................................. G06F 15/173
(52) U.S. Cl. .................................... 709/224; 709/229
(58) Field of Search ............................... 709/200, 220, 709/245, 229, 224, 226, 227, 221; 713/163; 370/230, 221, 245; 707/10; 711/167

(56) References Cited

U.S. PATENT DOCUMENTS

| | | | | |
|---|---|---|---|---|
| 5,778,185 A | * | 7/1998 | Gregerson et al. | 709/226 |
| 5,828,836 A | * | 10/1998 | Westwick et al. | 709/200 |
| 5,938,732 A | * | 8/1999 | Lim et al. | 709/229 |
| 6,047,324 A | * | 4/2000 | Ford et al. | 709/227 |
| 6,119,171 A | * | 9/2000 | Alkhatib | 709/245 |
| 6,131,095 A | * | 10/2000 | Low et al. | 707/10 |
| 6,178,439 B1 | * | 1/2001 | Feit | 709/200 |
| 6,185,184 B1 | * | 2/2001 | Mattaway et al. | 370/230 |
| 6,195,751 B1 | * | 2/2001 | Caronni et al. | 713/163 |
| 6,199,065 B1 | * | 3/2001 | Kenyon | 707/10 |
| 6,205,477 B1 | * | 3/2001 | Johnson et al. | 709/220 |
| 6,246,666 B1 | * | 6/2001 | Purcell et al. | 370/221 |
| 6,260,068 B1 | * | 7/2001 | Zalewski et al. | 709/226 |
| 6,324,580 B1 | * | 11/2001 | Jindal et al. | 709/228 |
| 6,370,656 B1 | * | 4/2002 | Olarig et al. | 714/23 |
| 6,381,218 B1 | * | 4/2002 | McIntyre et al. | 370/245 |
| 6,415,373 B1 | * | 7/2002 | Peters et al. | 711/167 |
| 6,427,163 B1 | * | 7/2002 | Arendt et al. | 709/201 |

OTHER PUBLICATIONS

Renesse et al., "A Gossip–STyle Failure Detection Service", 1996, ChapTman & Hall, pp. 1–16.*

Shin et al., "Reusable Middleware Service", College of Engineering University of MIchigan, pp. 1–3.*

Albitz, et al., "Chapter 10: Advanced Features and Security, DNS Dynamic Update", *DNS and BIND, Third Edition*, pp. 231–232, (1998).

* cited by examiner

*Primary Examiner*—John Follansbee
*Assistant Examiner*—Jungwon Chang
(74) *Attorney, Agent, or Firm*—Carr LLP

(57) ABSTRACT

A determination whether a network is connected to the Internet is made by configuring a first computer in the network to periodically generate a heartbeat message to a second computer outside the network. The second computer determines whether the heartbeat message is received, the receipt of which heartbeat message is indicative that the network is connected to the Internet.

12 Claims, 10 Drawing Sheets

| NAME | TYPE | CLASS | RDATA |
|---|---|---|---|
| CUSTOMER.COM. | SOA | IN | MNAME=NS1.NSPROVIDER.COM. |
| CUSTOMER.COM. | NS | IN | NS1.NSPROVIDER.COM. |
| MAIL.CUSTOMER.COM. | MX | IN | PREFERENCE=0 EXCHANGE=DOPEY.CUSTOMER.COM. |
| MAIL.CUSTOMER.COM. | MX | IN | PREFERENCE=10 EXCHANGE=SMTP40.MAILPROVIDER.COM. |
| WWW.CUSTOMER.COM. | CNAME | IN | GRUMPY.CUSTOMER.COM. |
| NEWS.CUSTOMER.COM. | CNAME | IN | BASHFUL.CUSTOMER.COM. |
| GW.CUSTOMER.COM. | CNAME | IN | DOPEY.CUSTOMER.COM. |
| GRUMPY.CUSTOMER.COM. | A | IN | 47.0.0.1 |
| SNEEZY.CUSTOMER.COM. | A | IN | 47.0.0.2 |
| DOPEY.CUSTOMER.COM. | A | IN | 47.0.0.3 |
| BASHFUL.CUSTOMER.COM. | A | IN | 47.0.0.4 |
| HAPPY.CUSTOMER.COM. | A | IN | 47.0.0.5 |
| HAPPY.CUSTOMER.COM. | A | IN | 47.1.0.1 |
| HEWEY.CUSTOMER.COM. | A | IN | 47.1.0.2 |
| DEWEY.CUSTOMER.COM. | A | IN | 47.1.0.3 |

*FIG. 1A*

| NAME | TYPE | CLASS | RDATA |
|---|---|---|---|
| CUSTOMER.COM. | DTG_ID | IN | ID=3711<br>RTSTVALID=FALSE<br>RTST=<UNDEFINED> |
| GRUMPY.CUSTOMER.COM. | DTG_INFO | IN | DTG IDENTIFIER=3711<br>ORIGINAL RR TYPE=A<br>ORIGINAL RDATA LENGTH=4<br>ORIGINAL RDATA=47.0.0.1<br>INACTIVE RESPONSE TYPE=1<br>TEXT LENGTH=26<br>ALTERNATE RDATA LENGTH=<UNDEFINED><br>OPTIONAL TEXT=THE NETWORK IS UNAVAILABLE<br>OPTIONAL ALTERNATE RR TTL=<UNDEFINED><br>OPTIONAL ALTERNATE RDATA=<UNDEFINED> |
| SNEEZY.CUSTOMER.COM. | DTG_INFO | IN | DTG IDENTIFIER=3711<br>ORIGINAL RR TYPE=A<br>ORIGINAL RDATA LENGTH=4<br>ORIGINAL RDATA=47.0.0.2<br>INACTIVE RESPONSE TYPE=1<br>TEXT LENGTH=0<br>ALTERNATE RDATA LENGTH=<UNDEFINED><br>OPTIONAL TEXT=<UNDEFINED><br>OPTIONAL ALTERNATE RR TTL=<UNDEFINED><br>OPTIONAL ALTERNATE RDATA=<UNDEFINED> |
| DOPEY.CUSTOMER.COM. | DTG_INFO | IN | DTG IDENTIFIER=3711<br>ORIGINAL RR TYPE=A<br>ORIGINAL RDATA LENGTH=4<br>ORIGINAL RDATA=47.0.0.3<br>INACTIVE RESPONSE TYPE=0<br>TEXT LENGTH=0<br>ALTERNATE RDATA LENGTH=<UNDEFINED><br>OPTIONAL TEXT=<UNDEFINED><br>OPTIONAL ALTERNATE RR TTL=<UNDEFINED><br>OPTIONAL ALTERNATE RDATA=<UNDEFINED> |

*FIG. 1B - 1*

| NAME | TYPE | CLASS | RDATA |
|---|---|---|---|
| BASHFUL.CUSTOMER.COM. | DTG_INFO | IN | DTG IDENTIFIER=3711<br>ORIGINAL RR TYPE=A<br>ORIGINAL RDATA LENGTH=4<br>ORIGINAL RDATA=47.0.0.4<br>INACTIVE RESPONSE TYPE=2<br>TEXT LENGTH=<UNDEFINED><br>ALTERNATE RDATA LENGTH=4<br>OPTIONAL TEXT=<UNDEFINED><br>OPTIONAL ALTERNATE RR TTL=3600<br>OPTIONAL ALTERNATE RDATA=128.83.17.101 |
| HAPPY.CUSTOMER.COM. | DTG_INFO | IN | DTG IDENTIFIER=3711<br>ORIGINAL RR TYPE=A<br>ORIGINAL RDATA LENGTH=4<br>ORIGINAL RDATA=47.0.0.5<br>INACTIVE RESPONSE TYPE=0<br>TEXT LENGTH=0<br>ALTERNATE RDATA LENGTH=<UNDEFINED><br>OPTIONAL TEXT=<UNDEFINED><br>OPTIONAL ALTERNATE RR TTL=<UNDEFINED><br>OPTIONAL ALTERNATE RDATA=<UNDEFINED> |
| HAPPY.CUSTOMER.COM. | DTG_INFO | IN | DTG IDENTIFIER=3711<br>ORIGINAL RR TYPE=A<br>ORIGINAL RDATA LENGTH=4<br>ORIGINAL RDATA=47.1.0.1<br>INACTIVE RESPONSE TYPE=0<br>TEXT LENGTH=0<br>ALTERNATE RDATA LENGTH=<UNDEFINED><br>OPTIONAL TEXT=<UNDEFINED><br>OPTIONAL ALTERNATE RR TTL=<UNDEFINED><br>OPTIONAL ALTERNATE RDATA=<UNDEFINED> |

*FIG. 1B - 2*

| NAME | TYPE | CLASS | RDATA |
|---|---|---|---|
| HEWEY.CUSTOMER.COM. | DTG_INFO | IN | DTG IDENTIFIER=3711<br>ORIGINAL RR TYPE=A<br>ORIGINAL RDATA LENGTH=4<br>ORIGINAL RDATA=47.1.0.2<br>INACTIVE RESPONSE TYPE=0<br>TEXT LENGTH=0<br>ALTERNATE RDATA LENGTH=<UNDEFINED><br>OPTIONAL TEXT=<UNDEFINED><br>OPTIONAL ALTERNATE RR TTL=<UNDEFINED><br>OPTIONAL ALTERNATE RDATA=<UNDEFINED> |
| DEWEY.CUSTOMER.COM. | DTG_INFO | IN | DTG IDENTIFIER=3711<br>ORIGINAL RR TYPE=A<br>ORIGINAL RDATA LENGTH=<br>ORIGINAL RDATA=47.1.0.3<br>INACTIVE RESPONSE TYPE=0<br>TEXT LENGTH=0<br>ALTERNATE RDATA LENGTH=<UNDEFINED><br>OPTIONAL TEXT=<UNDEFINED><br>OPTIONAL ALTERNATE RR TTL=<UNDEFINED><br>OPTIONAL ALTERNATE RDATA=<UNDEFINED> |
| MAIL.CUSTOMER.COM. | DTG_INFO | IN | DTG IDENTIFIER=3711<br>ORIGINAL RR TYPE=MX<br>ORIGINAL RDATA LENGTH=22<br>ORIGINAL RDATA=<br>  PREFERENCE=0<br>  EXCHANGE=DOPEY.CUSTOMER.COM.<br>INACTIVE RESPONSE TYPE=0<br>TEXT LENGTH=0<br>ALTERNATE RDATA LENGTH=<UNDEFINED><br>OPTIONAL TEXT=<UNDEFINED><br>OPTIONAL ALTERNATE RR TTL=<UNDEFINED><br>OPTIONAL ALTERNATE RDATA=<UNDEFINED> |

*FIG. 1B - 3*

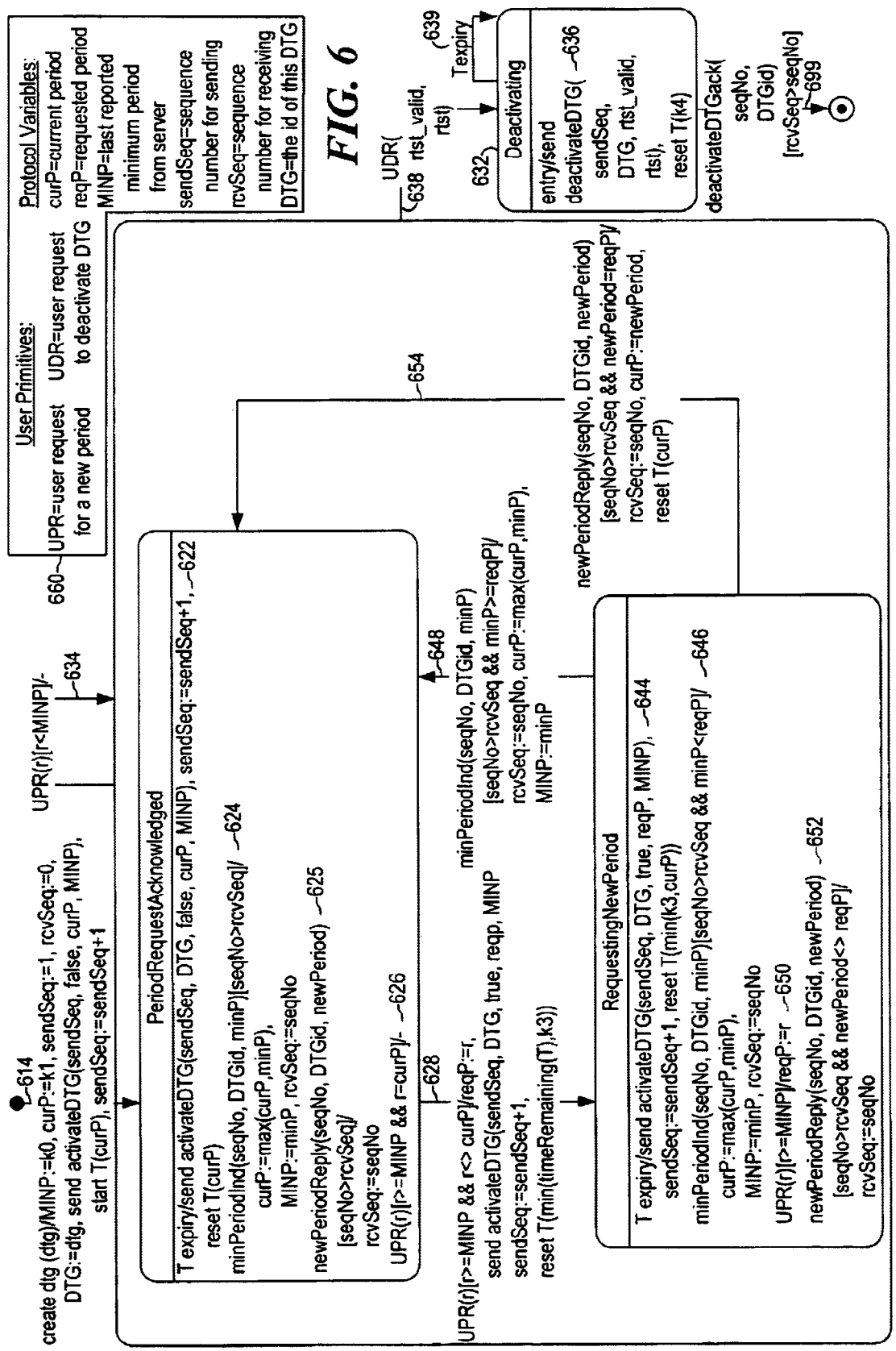

DYNAMIC TOPOLOGY NOTIFICATION EXTENSIONS FOR THE DOMAIN NAME SYSTEM

TECHNICAL FIELD OF THE INVENTION

The invention generally relates to a distributed database name registry for the Internet well-known as the Domain Name System (DNS) and, more particularly, to a method for dynamically notifying the DNS global database to reflect the loss and re-establishment of network connectivity of hosts or networks from the Internet.

BACKGROUND OF THE INVENTION

In the 1970's and early 1980's, the Internet comprised a small collection of educational and military networks, to which networks computers were attached which were represented by simple names. The names of the computers were, and still are, easier to remember than their network addresses which are required for communication over the network. As a consequence, a small text file containing the name and address of all computers was made available for download to all users on the network. Users could place a copy of the text file on their computers for use in translating a computer name to its associated Internet address. Software that needed to communicate with the named computer could then look up the computer address associated with the name in the text file, and then send messages to the computer address over the network.

As the Internet grew, the foregoing rather primitive address-to-name translation method became intractable. Eventually, a system, commonly referred to as the Domain Name System (DNS), was designed to make the name-to-address association for computers scaleable. DNS is a standard that defines the data schema and query and response protocols for a distributed database. Unlike the past when simple names were associated with computer network addresses, DNS defines mappings from hierarchical domain names to sets of generic resource records (RR's). A network address is one type of resource record (RR). But DNS also defines other RR types that are useful in the Internet. Some of the other commonly used RR types include mail exchange and canonical name. DNS further defines how the hierarchical domain name space is partitioned into zones, wherein a specific database server (name server) is only responsible for knowing the information contained in a small set of zones. Zones allow the responsibility for the maintenance of domain name-to-resource mappings to be distributed in a hierarchical fashion to the entities that administer the resources.

The hierarchical and distributed nature of DNS has accommodated the scale of growth the Internet has recently seen, but DNS was based on a few assumptions about the Internet which are becoming less accurate as the Internet continues to grow.

Firstly, it was designed around the assumption that the data it maintains would change very infrequently. Thus, the standard method of modifying the data stored in DNS has been to modify a flat text file, which is the input file for a DNS name server. As discussed above, a name server refers to a program that stores information about the DNS. Name servers typically have complete information about a part or multiple parts of the DNS that is applicable to the program. The area of authority is called a zone. Name servers contain data files that store RR's that describe the zone. One of the functions provided by the name server is to provide DNS domain name to address mapping for the zone.

Once the zone file are modified, the name server is then told to re-read its entire input file into memory in order to obtain a copy of the modifications. Not until the recent Request For Comments (RFC) standards documents published by the Internet Engineering Task Force [RFC 2136 and RFC 2137], have protocols been defined that allow a client computer to securely and dynamically insert, update, and delete information stored in the DNS.

Secondly, the design of DNS assumed that the computers in the network would be continuously connected to the network. More generally, DNS was designed under the assumption that the resources identified by the RR's would always be available to the network as a whole.

As more computers are gaining access to the Internet, it is becoming more common for many such computers to frequently access the Internet via a dial-up connection for a period of time, after which period of time the computer is disconnected. Additionally, as a result of a limited address space that has been allocated to many networks, a protocol referred to as Dynamic Host Configuration Protocol (DHCP) has been developed which enables computers to periodically connect and disconnect to and from such networks. Therefore, the second design assumption mentioned above is less generally applicable than it was when it was made.

There are other drawbacks to assuming that computers are continuously connected to the Internet. For example, there is no way for DNS to return an alternate address for a computer that is not connected to the Internet. Furthermore, when a network becomes disconnected from the Internet, there is no way to provide any indication via DNS of when that network will be reconnected.

Therefore, what is needed is a mechanism to keep DNS name servers constantly aware of the connectivity of the computers that provide resources named in the Domain Name System. It can be appreciated that it would be desirable for a name server to be able to provide intelligent responses to queries for resources that are not connected to the network at a particular time, wherein such responses include alternate addresses as well as an indication of when resources will be available again.

SUMMARY OF THE INVENTION

In accordance with the present invention, a method is provided which defines two related protocols. The first protocol allows a customer to create, modify and delete logical groups of resource records, defined as Dynamic Topology Groups (DTG's), within a specific domain name zone. A DTG is a group of DNS resource records that refer to groups of resources that are on some part of the Internet whose connectivity to the Internet is dynamic. The second protocol requires a client computer in the network associated with the DTG to periodically send a heartbeat message to the primary master name server for the DTG's domain name zone. The heartbeat message is used by the primary master name server to determine if the network associated with the DTG is still connected. Once a name server is able to determine whether or not network resources referenced by its resource records are available, it can then give a negative response to a client issuing a query for resources that are not available. A negative response from DNS for a resource that is not connected to the Internet has the advantage of more quickly informing the client that the resource being queried is unavailable. Furthermore, a name server can provide additional information in the response to the query, such as a text message that can give information to the client, or an indication of when the resource is expected to again become available.

BRIEF DESCRIPTION OF THE DRAWINGS

For a more complete understanding of the present invention, and the advantages thereof, reference is now made to the following descriptions taken in conjunction with the accompanying drawings, in which:

FIG. 1A is a table showing DNS zone data for the example network of FIG. 1;

FIG. 1B is a table showing additional records necessary for describing Dynamic Topology Group information for the example network of FIG. 1;

FIG. 6 is a UML state diagram describing the behavior of a server computer and the heartbeat protocol.

DETAILED DESCRIPTION OF THE INVENTION

Figure 1:
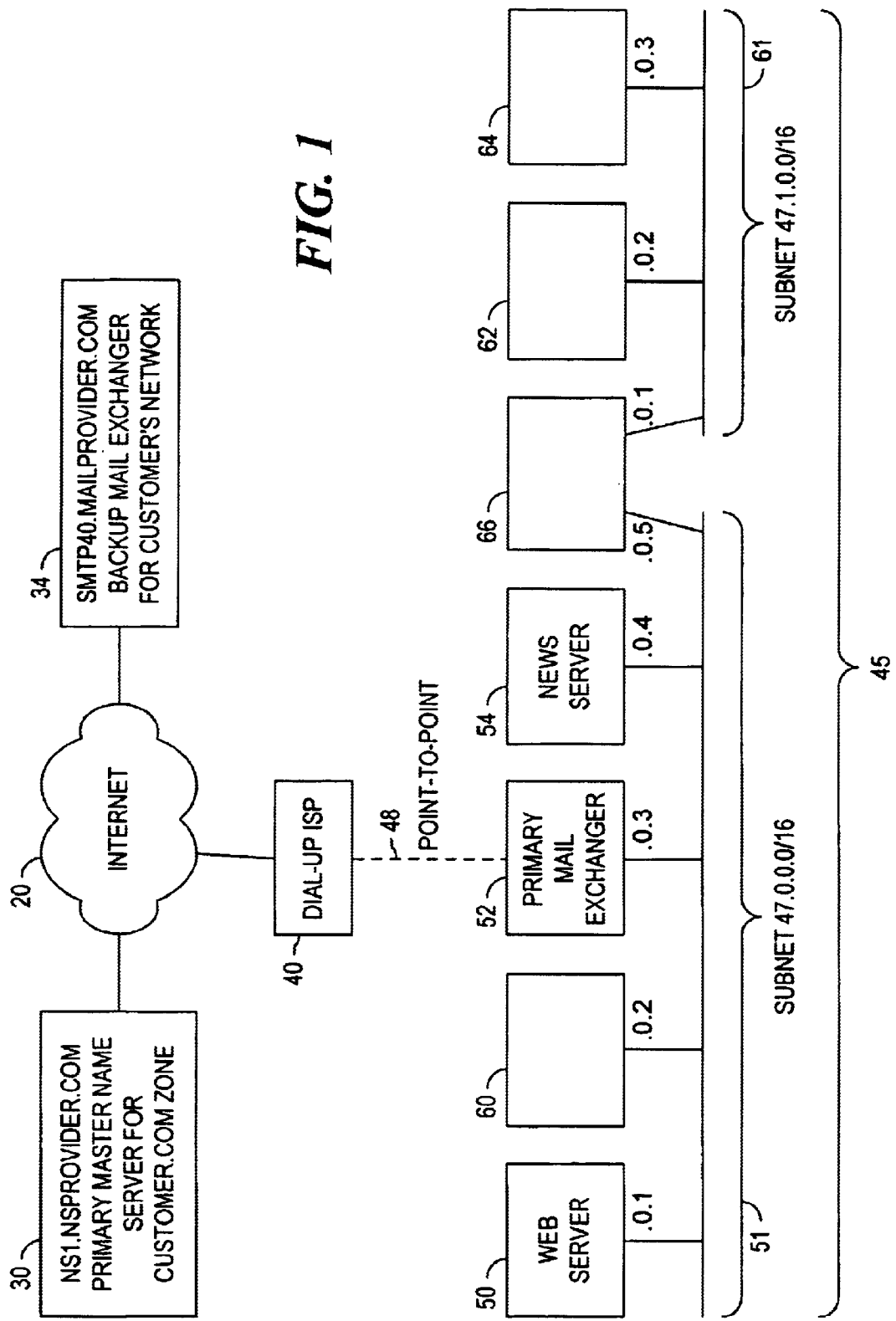
FIG. 1 is a high-level schematic diagram exemplifying an Internet network composed of the public Internet and customer sub-nets.

In the discussion of the FIGURES, the same reference numerals will be used throughout to refer to the same or similar components. In addition, various discussions will include bracketed references to Internet standard documents well-known as Request For Comments (RFC).

FIG. 1 provides an example Internet network comprising the public Internet 20, a primary master name server 30 for a domain name zone named "customer.com.", a backup mail exchanger 34 for a customer's network (described below), a dial-up Internet Service Provider (ISP) 40, and a single customer with the name "customer.com." and a plurality of computers 50, 52, 54, 60, 62, 64, and 66. The name server 30 has domain name "nsl.nsprovider.com." and the backup mail exchanger 34 domain name is "smtp40.mailprovider.com.". In the present example, the customer's network comprises an internet 45 consisting of two subnets 51 and 61 having the addresses 47.0.0.0/16 and 47.1.0.0/16, respectively. The subnet 51 having the address 47.0.0.0/16 comprises five computers 50, 52, 54, 60, and 66, and the subnet 61 having the address 47.1.0.0/16 comprises three computers 62, 64, and 66. As shown, the computer 66 resides on both subnets 51 and 61, and functions as a router connecting together the two subnets 51 and 61.

The customer internet 45 is connected to the public Internet 20 via a point-to-point link 48 between one of the customer's computers, such as the computer 52, and the dial-up ISP 40. Note that the computer 52 also has been assigned as the primary mail exchanger for the "customer.com." domain. In the present example, the Internet Protocol (IP) addresses of all the represented computers 50, 52, 54, 60, 62, 64, and 66 are permanently assigned by the ISP; each computer is manually configured with its assigned addresses. As shown, each computer 50, 52, 54, 60, 62, 64, and 66 in the "customer.com." internet has at least one address which is an extension of its respective subnet address. For example, the computer 50 functions as a web server with the address of 47.0.0.1, and is named "grumpy.customer.com.". The router 66 has an address on each subnet 51 and 61 (47.0.0.5 and 47.1.0.1, respectively) but only one name—"happy.customer.com.".

Also, in the present example, all the resource records associated with the computers in the customer's internet are all in the same domain name zone, which is rooted at the domain name "customer.com.".

FIG. 1A is a table showing how the domain name zone data for FIG. 1 would appear for the customer without the use of dynamic DNS topology extensions. The leftmost column, labeled "NAME", provides the DNS domain name associated with each resource record for the zone "customer.com.". The next column, labeled "TYPE", indicates the type of RR. The next column from the TYPE column is a column labeled "CLASS" which indicates that it is an Internet RR. The next column from the TYPE column is a column labeled RDATA column represents specific information provided by the RR. The content of RDATA column is determined by the type of RR. A Start of Authority (SOA) RR, indicates that the master name (mname) server for "customer.com." has the domain name of "nsl.nsprovider.com.", which is the pimary master 30 of the zone "customer.com." as shown in FIG. 1. The column labels NAME, TYPE, CLASS, and RDATA are fields of a DNS RR defined conceptually by RFC 1034 and in further detail in RFC 1035, both of which RFC's are published by Internet Engineering Task Force and incorporated herein by reference in their entirety. Because the RFC 1034 and RFC 1035 are considered to be well-known standards, the NAME, TYPE, CLASS, and RDATA fields will not be described in further detail herein.

The name server (NS) RR provides a list of all authoritative name servers of the zone named by "customer.com.". In this case, the RRDATA column indicates that "nsl.nsprovider.com." 30 is the only authoritative name server for the "customer.com." zone describing the customer's subnets 51 and 61 of FIG. 1.

The mail exchanger (MX) RR provides the domain name of a mail exchanger for the "customer.com." zone. The record indicates a priority level and exchange for the domain name. There are two MX RR listings because two mail exchangers 52 and 34 are identified in FIG. 1. The first MX entry indicates that the preference=0 (the highest priority) is assigned to the primary exchange 52. The next MX RR indicates a lower priority 10 preference for the backup exchange 34.

Three canonical name (CNAME) RR's are depicted. Generally, the CNAME RR's are utilized to relate an alias provided in the NAME column to the real domain name associated with each alias. For example, the alias "www.customer.com." has a real domain name of "grumpy.customer.com.".

The remaining RR's are address (A) records that contain the Internet Protocol (IP) address for a particular network interface. For example, the first A entry shows that the domain name "grumpy.customer.com." has an address 47.0.0.1, exemplified by the computer 50 in FIG. 1.

In accordance with the present invention, a Dynamic Topology Group (DTG) is defined as a group of resource records which refer to resources on a portion of the Internet which may periodically become disconnected. If Dynamic Topology extensions to DNS were being used for the network described in FIG. 1 and FIG. 1A, a single DTG would be created for resource records from both subnets 51 and 61. All the resource records of type A and the MX record with exchange="dopey.customer.com." from FIG. 1A would be the members of this DTG. The A records would be part of the DTG in this example because the ability for a host outside the customer's network to exchange messages with any of the hosts inside the customer's network depends on the customer's network being connected to the Internet. The MX record's membership in the DTG would be optional, because in this example, the customer also has a backup mail exchanger 34, which will receive mail for "mail.customer. com." even if "dopey.customer.com." 52 is unreachable. However, it is still advantageous to include the MX RR in the DTG, because mail delivery agents sending mail to a mailbox at "mail.customer.com." will not have to wait for Transmission Control Protocol (TCP) to time out while trying to connect to "dopey.customer.com."; rather, DNS will indicate that "dopey.customer.com." is not available. When the link between "gw.customer.com." and the ISP is connected, some machine in the customer's network (most likely computer 52) would execute the heartbeat protocol between itself and "ns1.nsprovider.com."

In accordance with the present invention, a client computer (client) issues a request to a DNS server for the creation of a DTG using the present DNS Update protocol as described in Request for Comments 2136 (referred to hereinafter as "RFC 2136"), entitled "Dynamic Updates in the Domain Name System (DNS UPDATE)" by P. Vixie, S. Thomson, Y. Rekhter, and J. Bound, and published by Internet Engineering Task Force in April 1997, which is considered to be well-known to those skilled in the art and will, therefore, not be discussed in further detail. RFC 2136 is incorporated herein by reference in its entirety.

Upon receiving this message, the DNS server, which is the primary master for the zone containing all the RR's which will be in the DTG, allocates a unique numeric identifier which designates a new (and initially empty) DTG. This identifier is returned to the client. The client computer then uses the DNS Update protocol [RFC 2136] to add new RR's to the name server. These new RR's contain enough information to associate an RR that is already in the name server's zone data with the DTG that was just created. The name server assumes that the initial state of the DTG is "inactive". A client computer which is physically in the customer's network is then expected to send periodic heartbeat messages (activateDTG messages) to the primary master DNS server. Reception of these messages by the DNS server indicates that the customer's network is still connected to the Internet. When a primary master server receives such activateDTG messages from a client, it unconditionally changes the state of the DTG to active.

If the primary master stops receiving these messages, it assumes the customer's network is disconnected and changes the state of the DTG to inactive. DNS queries matching RR's belonging to a DTG that is in the "active" state are handled normally (as defined by RFC's 1034 and 1035). However, DNS queries matching RR's that belong to a DTG that is in the inactive state are handled in any one of at least four ways as described below.

First, the name server 30 may respond to the query exactly as if the RR does not exist in the DNS database. (An answer count of zero is returned in the answer section of the DNS response and RCODE indicates a name error.)

Second, the name server 30 may respond to the query with zero answers, an RCODE indicating no error, and with some combination of the optional text (TXT) and optional Return-to-Service Time (RTST) RR's in the additional section of the DNS response. The TXT RR contains a human-readable text message indicating that the resource is temporarily unavailable. The Return-to-Service Time (RTST) RR is a new resource record type defined by the present invention, which contains an absolute time indicating when the resource is expected to become available (i.e., when the RR's DTG is expected to enter the active state). This is useful for notifying the name server of planned downtime.

Third, the name server 30 may respond to the query with a substitute RR. This is most useful with A type RR's. The primary master DNS server provides a response with an alternate address that is the address of a computer outside the network associated with the DTG. This allows a computer in another network to take over the role of the customer's computer while the network on which the customer's computer resides is disconnected.

And fourth, the name server 30 may respond to the query with a server failure return code. This guarantees that no resolver or application program will interpret the response as meaning that the named resource does not exist.

The type of response for each RR in the DTG can be specified separately when the RR is added using the Dynamic Update protocol [RFC 2136]. This enables the DNS to provide intelligent responses to queries involving resources that are not available to the network as a whole.

In accordance with the present invention, the first protocol, i.e., the DTG group management protocol, supports four basic functions: DTG creation, DTG deletion, DTG information queries, and DTG specific RR modifications. These functions are supported by adding and deleting newly defined RR types using the Dynamic Update Protocol. These RR types are described in greater detail below.

The DTG creation is initiated when a client requests that the name server allocate a numeric identifier that will be used to identify the new DTG. If the server complies with the request, the new DTG identifier 302 is returned to the client, and memory of the DTG is maintained on the primary master name server across restarts.

DTG deletion is a request for the DNS server to delete a DTG that represents the logical association of a set of RR's. If the server complies with the request, the RR's that are members of the group are not deleted, but only their association to the group.

DTG information queries are achieved with standard DNS queries. Since all the DTG related information in the domain name zone is represented in terms of resource records, any of this information (such as listing all the RR's in a DTG group) can be obtained using DNS standard queries.

Membership of an RR in a DTG is represented in the domain name zone data by the presence of an additional RR in the zone data that creates an association between the first RR and the DTG. This additional RR is called a DTG__ INFO RR, and it will be described in detail later in this document. Thus, DTG specific RR modification is achieved by using the DNS update protocol to add, delete, or modify instances of the DTG__INFO RR in the domain name zone.

The new RR types and their formats are described later in this document.

The second protocol of the present invention is called the heartbeat protocol. It allows a client computer (client) in a network associated with a DTG to send a heartbeat message (an activateDTG message) to the primary master name server for the DTG's zone on behalf of all RR's comprising the DTG. The heartbeat protocol allows either the client or the server to change the rate at which the client sends (and the server expects to receive) activateDTG messages. It is useful to be able to change the rate at which the client computer sends the activateDTG messages because the administrator of the network associated with the DTG is the entity that knows how long the network is expected to remain connected to the Internet. Accordingly, if the connection to the Internet is unstable, the client can increase the rate at which it sends (and at which the server expects to receive) the activateDTG messages. The faster heartbeat ensures that the name server will quickly detect if the customer's network becomes unexpectedly disconnected from the Internet and it will quickly provide special treatment queries for the DTG. However, if the connection is reliable, the customer can send activateDTG messages at a very low rate.

At any time, the DNS name server can indicate to the client the maximum rate at which the client is allowed to send activateDTG messages to the server. This prevents the server from becoming flooded with traffic. The ability for the client and the server to have cooperative control over the rate at which the client sends messages to the server allows the client to send at the most appropriate rate, while still allowing the server to scale to large numbers of clients.

When the client decides to disconnect its network from the Internet, the client sends an explicit message (deactivateDTG) to tell the name server to change the state of the DTG to inactive.

The heartbeat protocol preferably comprises at least the following five messages: activateDTG, deactivateDTG, deactivateDTGack, newPeriodReply, and minPeriodIndication.

The activateDTG message is sent from the client to the primary master DNS name server. When the DNS server receives this message from the client, it must unconditionally change the state of the indicated DTG to active. It also resets any timers whose expiration would cause the state of the DTG to change to inactive.

The deactivateDTG message is sent from the client to the name server. When the server receives this message, it must unconditionally change the state of the indicated DTG to inactive. The client would typically send the deactivateDTG message just before the client's network becomes unavailable as part of planned downtime.

The deactivateDTGack message is sent from the name server to the client. It is an acknowledgment that the server has received and understood a deactivateDTG message from the client. It should be sent by the server when the server receives a deactivateDTG message.

The newPeriodReply message is sent from the DNS name server to the client. It is sent in response to an activateDTG message from the client, in which message parameters indicate that the client wishes to change the rate at which it sends activateDTG messages. This allows the implicit request in the activateDTG message to be acknowledged by the server.

The minPeriodIndication message is sent from the DNS name server to the client. It is sent by the server any time the server discovers that the client is not aware of the current minimum allowable period it may use to send activateDTG messages.

By using the heartbeat protocol, the DNS name server infers that if it can receive the activateDTG messages from some computer in the customer's network then there must also be a network route from somewhere inside the customer's network to the DNS server. Although this does not imply traffic can get back into the customer's network from the outside, it strongly suggests this is the case.

The model in which this protocol is intended to be used is one in which the customer's network (possibly just one computer) is separated from the backbone of the public Internet by one or more links that are dynamic or unreliable. Referring again to FIG. 1, the link between the computer "dopey.customer.com.", 52 and the dial-up ISP is a dynamic link. This model also presumes that the activateDTG messages sent to the primary master DNS server follow a route which traverses at least one router on the backbone. This is typically the case when the primary master DNS server is on the backbone.

In order to support the DTG dynamic topology functions, the following three new DNS resource record types are defined for the present invention: DTG_ID, DTG_INFO, and RTST.

Figure 2:
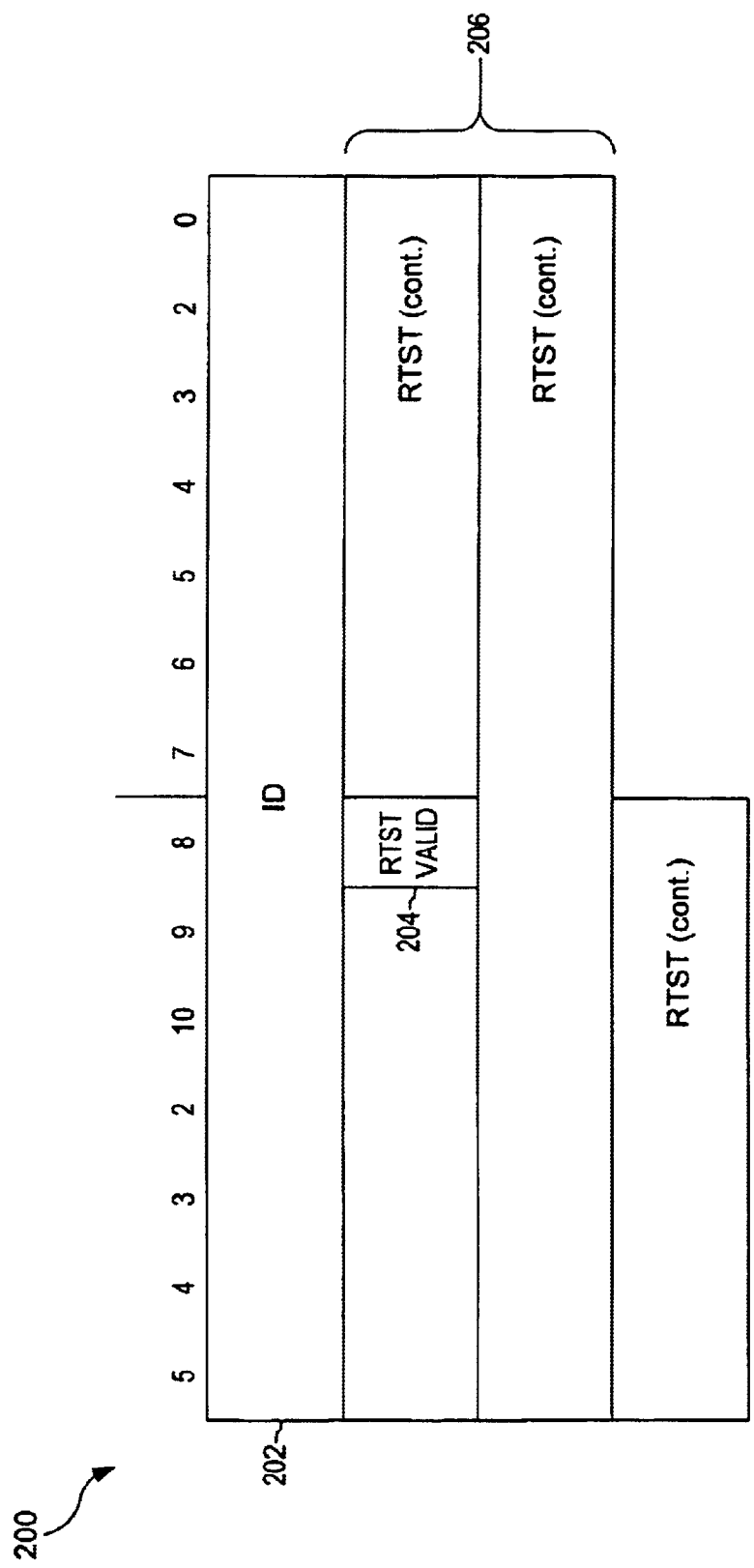
FIG. 2 shows a preferred embodiment of the format for a DTG_ID resource record, in accordance with the present invention.

The first new RR type is named DTG_ID. This resource record is used to support creation and deletion of DTG's. This RR is used in the name server to represent the existence of a (possibly empty) DTG. FIG. 2 shows a preferred embodiment of the format for the RDATA field 200 of the DTG_ID RR. The RDATA field 200 of this RR contains multiple fields. The id field 202 is a 2's complement signed integer which uniquely identifies a DTG within a zone. There is one special value for the id field 202, called the INVALID_DTG_ID. The INVALID_DTG_ID is a reserved identification value that is not available as a DTG identification number. The rtstValid field 204 is a one-bit field in which the value 1 indicates that the value in the following RTST field 206 is valid, and in which the value 0 means that the value in the RTST field 206 is invalid. The RTST field 206, which follows, is a 48-bit, 2's complement unsigned number (in big-endian byte order). The value of this number represents a time that occurs at the specified number of seconds after some-point in time such as, for example, Jan. 1, 1970. This is the absolute time at which the DTG identified by the id field 202 is expected to enter the active state. If a name server receives a deactivateDTG message with an optional return-to-service time specified in the message, then this field contains that time. Otherwise, the rtstValid bit is set to false, and the value in this field is undefined. The NAME field (not shown) of the DTG_ID RR is always the same as the name of the zone.

Figure 3:
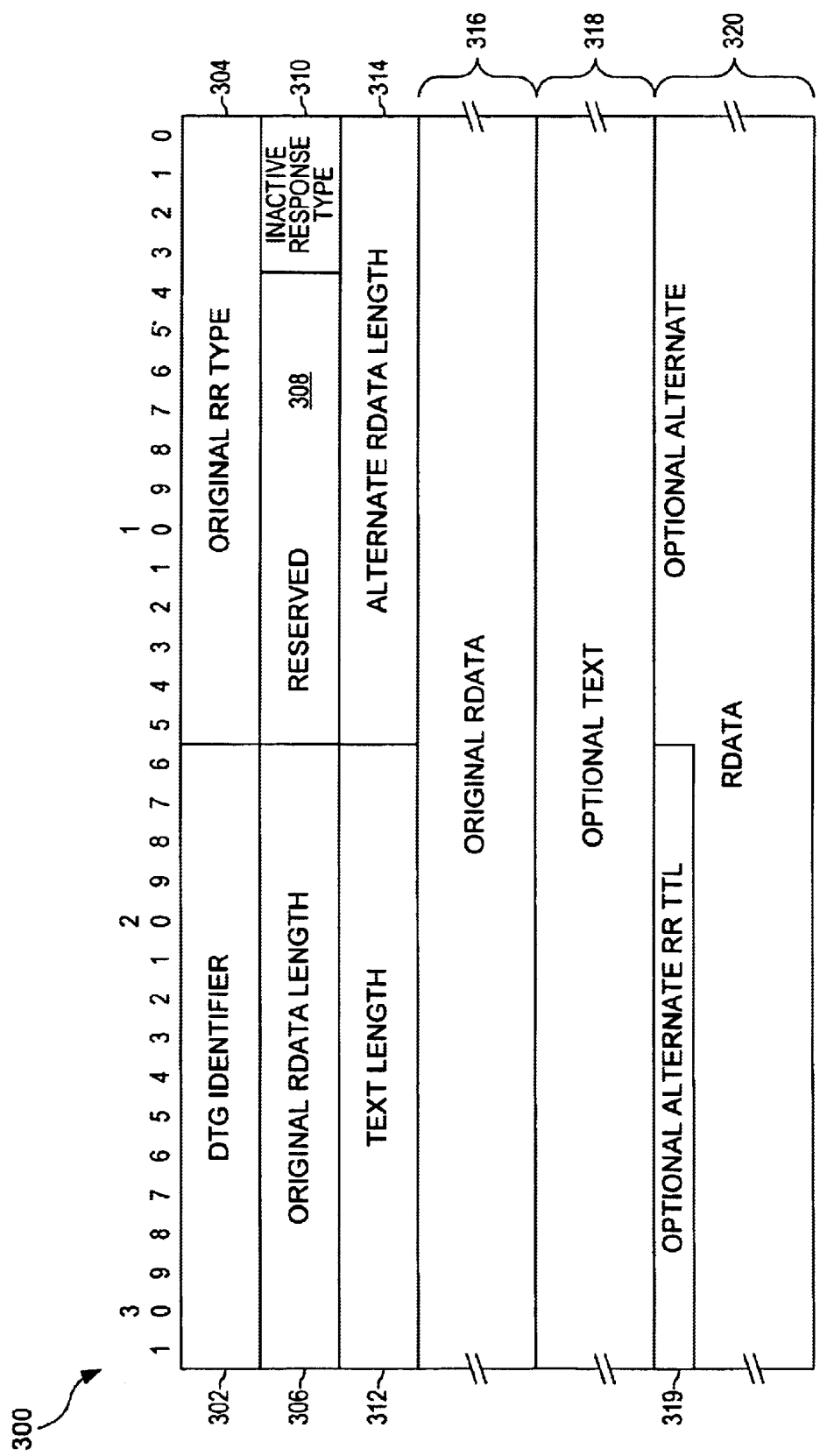
FIG. 3 shows a preferred embodiment of the format for a DTG_INFO resource record, in accordance with the present invention.

Dynamic topology notification also relies on the ability to associate extra information with each resource record that is added via the Dynamic Update protocol. This extra information consists of an optional DTG identifier that identifies which DTG (if any) is associated with the RR; an indication of which type of special response is given to queries for this RR when the DTG group to which it belongs is inactive; an optional text message; and an optional alternate RR to be given in the answer section of a query for this RR if the DTG to which the associated RR belongs is inactive. The DTG_INFO RR is used to support this. FIG. 3 provides a preferred embodiment of the format for a DTG_INFO RR type. The purpose of this RR is not to describe a resource in the network, but rather to describe additional properties of some other RR. Each DTG_INFO RR contains enough information to identify which RR it modifies, along with the information which modifies the RR. The DTG_INFO RR fields are described below.

In a preferred embodiment, a DTG identifier field 302 is interpreted as a signed 2's complement integer. As with the DTG_ID RR, the field 302 has one special value, namely, the INVALID_DTG_ID value.

The original RR type field 304 is a duplicate of the TYPE field of the RR which this DTG_INFO RR modifies.

The original RDATA length field 306 is a duplicate of the RDLENGTH field of the RR which this DTG_INFO RR modifies.

The reserved field 308 is reserved for future use. As such, all bits in the reserved field 308 should be set to zero.

The inactive response type field 310 is interpreted as an unsigned integer. The inactive response type field 310 defines how name server should respond to a query for the associated resource record when the DTG identified by the DTG identifier 302 is in the inactive state. In a preferred embodiment, four inactive response numerical values 0–3 are defined.

When the inactive response value is 0, a name server responds to the query exactly as if the associated RR does not exist in the DNS database. An answer count of zero is returned in the answer section of the DNS response, and the RCODE field indicates a name error.

When the inactive response value is 1, a name server responds to the query with zero answers, an RCODE indicating no error, an optional TXT RR that contains an optional text field 318, and an optional Return-to-Service Time (RTST) RR for the DTG in the additional section of the response. The optional TXT RR contains a human-readable text message which indicates that the resource is temporarily unavailable.

If the inactive response type is 1, the text length field 312 is a 16-bit unsigned integer (in big-endian byte order) that indicates how many bytes of data are in the optional text section of this RR. If the inactive response type is not 1, the value of the field 312 is undefined.

If the inactive response type is 1, the optional text field 318 contains data that will comprise the RDATA portion of a TXT RR that will be included in the additional section of a response to queries for the associated RR. If the inactive response type is not 1, then the value of this field 318 is undefined.

When the inactive response type is 2, a name server responds to a query with a substitute RR. This is most useful with type A RR's. A DNS server can provide a response with an alternate address that is the address of a computer outside the network associated with the DTG. This allows a computer in an alternate network to take over the role of a computer in a network which is disconnected.

If the inactive response type is 2, the alternate RDATA length field 314 is a 16-bit unsigned integer (in big-endian byte order) that indicates how many bytes of data are in the optional alternate RDATA field 320 of this message. If the inactive response type is not 2, the value of the field 314 is undefined.

The original RDATA field 316 is a duplicate of the RDATA field of the RR this DTG_INFO RR modifies.

If the inactive response type is 2, the optional alternate RR TTL field 319 contains the Time to Live (TTL) that will be copied into the alternate RR to be sent in responses to queries for the associated RR. If the inactive response type is not 2, then the value of the field 319 is undefined.

If the inactive response type is 2, the optional alternate RDATA field 320 comprises the RDATA portion of an RR that will be included in the answer section of a response to queries for the associated RR. The TYPE, CLASS, and NAME fields of the alternate RR returned are set to the same value as the TYPE, CLASS, and NAME fields of the associated RR which the DTG_INFO RR modifies.

When the inactive response type is 3, a name server responds to the query with an RCODE indicating server failure. This guarantees that no resolver (i.e., client library software used in generating DNS queries) nor any application program will interpret the response as if the named resource does not exist.

The original RR type 304, original RDATA length 316, and original RDATA fields 316 of the RDATA portion 300 of the DTG_INFO RR are combined with the NAME and CLASS (not shown) of the DTG_INFO RR to uniquely identify the RR in the zone that the DTG_INFO RR modifies.

Figure 4:
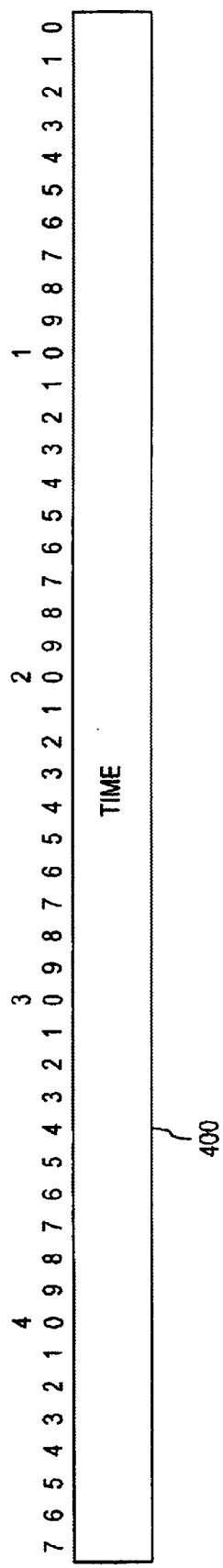
FIG. 4 shows a preferred embodiment of the format for the RTST resource record, in accordance with the present invention.

FIG. 4 shows a preferred embodiment of the format for the third new RR type known as the RTST RR type 400 which represents an absolute time. The RTST is a 48-bit, 2's complement unsigned number (represented externally in big-endian byte order). The value of this number represents a time that occurs at a specified number of seconds after a predetermined point in time such as, for example, 00:00:00 UTC, Jan. 1, 1970.

The DTG group management protocol defined in the present invention uses the DNS Update protocol and the newly defined RR types for creating and deleting DTGs and for adding, modifying, and deleting RR's that also have DTG information.

The format of the DNS UPDATE message is defined in RFC 2136 and known to the present art, but it is summarized here for clarity. It contains four sections. The first section identifies the zone of the DNS domain name space to which the UPDATE message applies. The second section contains a set of RR's, known as the prerequisite records, which describe a set of prerequisites that must be met before applying the changes specified in the update section. The third (Update) section contains a set of RR's that describe the changes to apply to the zone. The Update section is a sequence of RR's, each of which specifies one of four possible actions. The first possible action is to add the resource record in the Update section of the message to the zone. The second possible action is to delete all resource records from the zone whose NAME and TYPE match the NAME and TYPE of the resource record in the Update section of the message. The third possible action is to delete all resource records from the zone whose NAME matches the NAME of the resource record in the Update section of the message. The fourth possible action is to delete any resource record from the zone whose NAME, TYPE, RDLENGTH and RDATA are all equal to the those of the resource record in the Update section of the message.

The action taken for a specific RR depends on the values in the CLASS, TYPE, and RDATA fields of the RR in the Update section (RFC 2136, section 3.4.2.6). These actions are only performed if the conditions specified in the prerequisites section of the UPDATE message are satisfied.

The fourth section of the UPDATE message is called the Additional Data section. The Additional Data section may contain glue RR's, as discussed in RFC 1034, which are related to the update itself. They may also, however, contain any other RR type and still be decoded successfully.

As previously discussed, the DTG group management protocol defined uses the message framework as discussed above with respect to RFC 2136.

To create a DTG, an UPDATE message is composed with a DTG_ID RR in the Update section. The NAME field of this RR must be the name of the zone. The CLASS and TYPE fields of this RR are set as described in RFC 2136 to indicate that this is an operation to add this resource record to the zone. The value of the id field 202 in the RDATA section is the reserved value INVALID_DTG_ID. This message is a request to allocate a unique DTG identifier for the zone, add a DTG_ID RR to the zone with the id field 202 set to the newly allocated DTG identifier, and to return that RR to the sender in a DNS response message. The DNS server returns a response message with a DTG_ID RR in the answer section. The value of the id field 202 of this RR is either INVALID_DTG_ID if the server did not comply with the request, or the identifier for the newly created DTG otherwise.

Since the successful creation of a DTG results in adding a DTG_ID RR to the zone, any DNS UPDATE message can be used that would cause this RR to be deleted. Deletion of the DTG_ID RR from the zone also results in deletion of any information about that DTG that is in the zone. It does not delete any RR's that are members of the DTG, but it does delete any DTG_ID RR's whose DTG identifier field 302 matches the id of the DTG_ID RR being deleted.

To add DTG related information for an RR, a DTG_INFO RR is added to the zone that is associated with an existing RR in the zone. The NAME of the DTG_INFO RR is set to the NAME field of the RR it modifies. The TYPE and CLASS fields of the DTG_INFO RR are set as to indicate that the DTG_RR is to be added to the zone. (Again, see RFC 2136). The TTL field of the DTG_INFO RR is set to a value that the client thinks is appropriate for caching of the DTG_INFO RR in the network. The DTG identifier field 302 of the RDATA section of the DTG_INFO RR is set to the identifier of the DTG to which the modified RR belongs. The original RR TYPE field 304 of the RDATA section of the DTG_INFO RR is set to the value of the TYPE field of the RR it modifies. Similarly, the original RDATA length 306 and original RDATA 316 fields, respectively, of the RDATA section 300 of the DTG_INFO RR are set to the values of the RDLENGTH and RDATA fields of the RR that the DTG_INFO RR modifies. Values for the inactive response type 310, text length 312, alternate RDATA length 314, optional text 318, optional alternate RR TTL 319, and optional alternate RDATA 320 fields are set as appropriate based on the meanings described earlier in this section of the document. Successful completion of an UPDATE request with a DTG_INFO RR in the Update section results in a DTG_INFO RR being added to the zone, as described in RFC 2136.

As with the DTG_ID RR's, DTG_INFO RR's can be removed from a zone using the DNS Update Protocol without modification. However, the following consistency conditions must be met when adding and deleting DTG_INFO RR's. A DTG_INFO RR that exists in a zone must always be associated with exactly one RR that is present in the zone. A DTG_INFO RR in a zone is associated with another RR in that zone if the DTG INFO RR and the associated RR have the same values for NAME and CLASS; and if the original RR type 304, original RDATA length 306, and original RDATA fields 316 of the DTG_INFO RR respectively match the TYPE, RDLENGTH, and RDATA fields of the associated RR. Furthermore, the TYPE of the associated RR must not be DTG_ID or DTG_INFO.

Since all the information about DTG groups is represented in a zone in the form of resource records, zone transfers to any other name server (regardless of whether or not it understands the newly defined RR's) preserves this information.

Both DTG_ID and DTG_INFO RR's are standard RR's that, when added to the zone with the DNS Update Protocol, become part of the zone data. As such, their values can be requested in standard queries. The TTL field of these types of RR's has the same meaning as the TTL field of any RR.

Having completely described the DTG group management protocol, FIG. 1B exemplifies how the zone data for the customer's network 45 in FIG. 1 might be tabulated when the customer is using the Dynamic Topology extensions described above. The RR's tabulated in FIG. 1B are additional RR's supplementing the RR's listed in FIG. 1A to describe information related to the DTG of the customer's network 45. As discussed above, for the customer's network 45, there is exactly one DTG which contains all the RR's of type A, and the MX RR associated with computer 52. FIG. 1B Shows a table having a single DTG_ID RR which represents the single DTG in the customer's network 45. Additional zone data in FIG. 1B shows nine DTG_INFO RR's which represent the DTG information for the RR's that are members of the DTG. Various example values for inactive response types 310 and fields 312, 314, 318, 319, 320 in the DTG_INFO message 300 are provided for illustrative purposes.

In accordance with the present invention, the heartbeat protocol is executed between any client machine in the network associated with a DTG and the primary master name server for the zone containing the DTG. If a network contains RR's from multiple domain name zones, then separate DTG's must be created, and separate instances of the heartbeat protocol are performed for each DTG.

As discussed above, the heartbeat protocol preferably comprises at least the following five messages: activateDTG, deactivateDTG, deactivateDTGack, newPeriodReply, and minPeriodIndication.

The messages of the heartbeat protocol of the present invention have the following fields:

| activateDTG: | |
| --- | --- |
| SeqNo | A Natural number that increases with each message sent from a particular client. If any message is received whose seqNo is not greater than the highest previously received seqNo, that message is discarded. |
| DTGid | An identifier for the DTG that the client is activating. This field is equivalent to the id field in a DTG_ID message and a DTG identifier field in a DTG_INFO message |
| Requesting | A Boolean value indicating whether the client is requesting to send heartbeats to the server with a different period than it is already sending. |
| Period | A Natural number. If requesting is set to true, then this field is the period (in seconds) the client is requesting to use when sending activateDTG messages to the server. If requesting is set to false, this field is the period (in seconds) the client is currently using for sending activateDTG messages to the server. |
| MinP | A Natural number. This is the value of the minP parameter in the most recent minPeriodInd message the client received from the server. It is what the client thinks the server's minimum acceptable period is. |

| deactivateDTG: | |
|---|---|
| seqNo | A Natural number that increases with each message sent from a particular client. If any message is received whose seqNo is not greater than the highest previously received seqNo, that message is discarded. |
| DTGid | The identifier for the DTG to be deactivated. |
| RtstValid | A Boolean value indicating whether the following parameter (RTST) is valid. |
| RTST | A 48-bit unsigned natural number. It indicates when the DTG is expected to become active again. If rtstValid is true, it identifies a time that occurs at the specified number of seconds since Jan. 1, 1970 00:00:00 UTC. Otherwise, the value in this field is undefined. |

| deactivateDTGack: | |
|---|---|
| SeqNo | A Natural number that increases with each message sent from a particular server. If any message is received whose seqNo is not greater than the highest previously received seqNo, that message is discarded. |
| DTGid | The identifier for the DTG whose deactivation is being acknowledged |

| newPeriodReply: | |
|---|---|
| SeqNo | A Natural number that increases with each message sent from a particular server. If any message is received whose seqNo is not greater than the highest previously received seqNo, that message is discarded. |
| DTGid | The identifier for the DTG to which this message applies. |
| NewPeriod | This parameter is set to the value of the period paramter in the activateDTG message which this message is acknowledging. This value is what the server henceforth expects the client to use for its heartbeat period. |

| minPeriodInd: | |
|---|---|
| SeqNo | A Natural number that increases with each message sent from a particular server. If any message is received whose seqNo is not greater than the highest previously received seqNo, that message is discarded. |
| DTGid | The identifier for the DTG to which this message applies. |
| MinP | This parameter is set to the value of the minimum acceptable period the client may use to send activateDTG messages to the server. |

Each protocol process (the client and the server) maintains a sequence number, which it includes in all messages it sends. The sequence number sent in messages from the client is independent of the sequence number sent in messages from the server. However, each sequence number has the property that it always increases with subsequent messages sent by the process. This allows the recipient of protocol messages to discard messages which have been lost, corrupted, or re-ordered by the network. However, it also serves the purpose of ensuring that no two messages sent from a particular sender will ever be identical.

In order to ensure that the system can accommodate a continually increasing seqNo field, both the client and server must periodically store a seqNo value in stable storage that is slightly greater than the value of any seqNo it has sent. On software restarts, the seqNo of sent messages must start with this value. In addition, the seqNo may never be reset. Thus, it is recommended that the field be at least 64 bits in size.

Since the DTG group management functions are implemented using the Dynamic Update Protocol defined by RFC 2136, authentication of the messages can be achieved by using the cryptographic extensions to the DNS Update protocol, as defined in RFC 2137, "Secure Domain Name System Dynamic Update", by D. Eastlake, III, April, 1997. However, since the heartbeat protocol does not use DNS Dynamic Update, an authentication scheme must be provided.

It is desirable for the server in the heartbeat protocol to be able to authenticate all messages received from the client. This prevents an adversary from fraudulently causing a DTG to change state. Furthermore, it is desirable for the client to be able to authenticate messages received from the server. If an adversary could forge messages from the server, it could interfere with the correct operation of the heartbeat protocol, and thus cause a DTG to change state incorrectly.

Therefore, in addition to the fields shown above for the messages of the heartbeat protocol, all messages are preferably also provided with a digital signature appended thereto. The format of the signature is a message digest of the entire message which is signed with a cryptographic key in a manner well-known in the art. In a preferred embodiment, the well-known message digest algorithm such as MD-5 may be used to generate the digest, and a well-known public-key cryptosystem, such as RSA, may be used to sign the digests.

The use of digital signatures to authenticate messages is common practice, and an implementation of an authentication scheme based on the preceding description. is considered to be well-known to someone skilled in the art.

However, there is one property of this protocol that makes it susceptible to a specific kind of fraudulent attack by an adversary. In the heartbeat protocol, most of the messages have exactly the same values for most of the fields. If an adversary can capture a copy of a protocol message, and then send that exact copy to one of the valid protocol participants at a later time, then the adversary may be able to interfere with the protocol. This is commonly known as a "replay attack."

By design, the seqNo fields of the protocol messages are never reset. The reason for this design is to ensure that all protocol messages are distinct. A recipient will always discard a protocol message that does not have a higher seqNo than the highest seqNo of any protocol message it has received. Therefore, if an adversary captures a copy of a protocol message and then subsequently replays it, the message will be ignored by the recipient.

Figure 5:
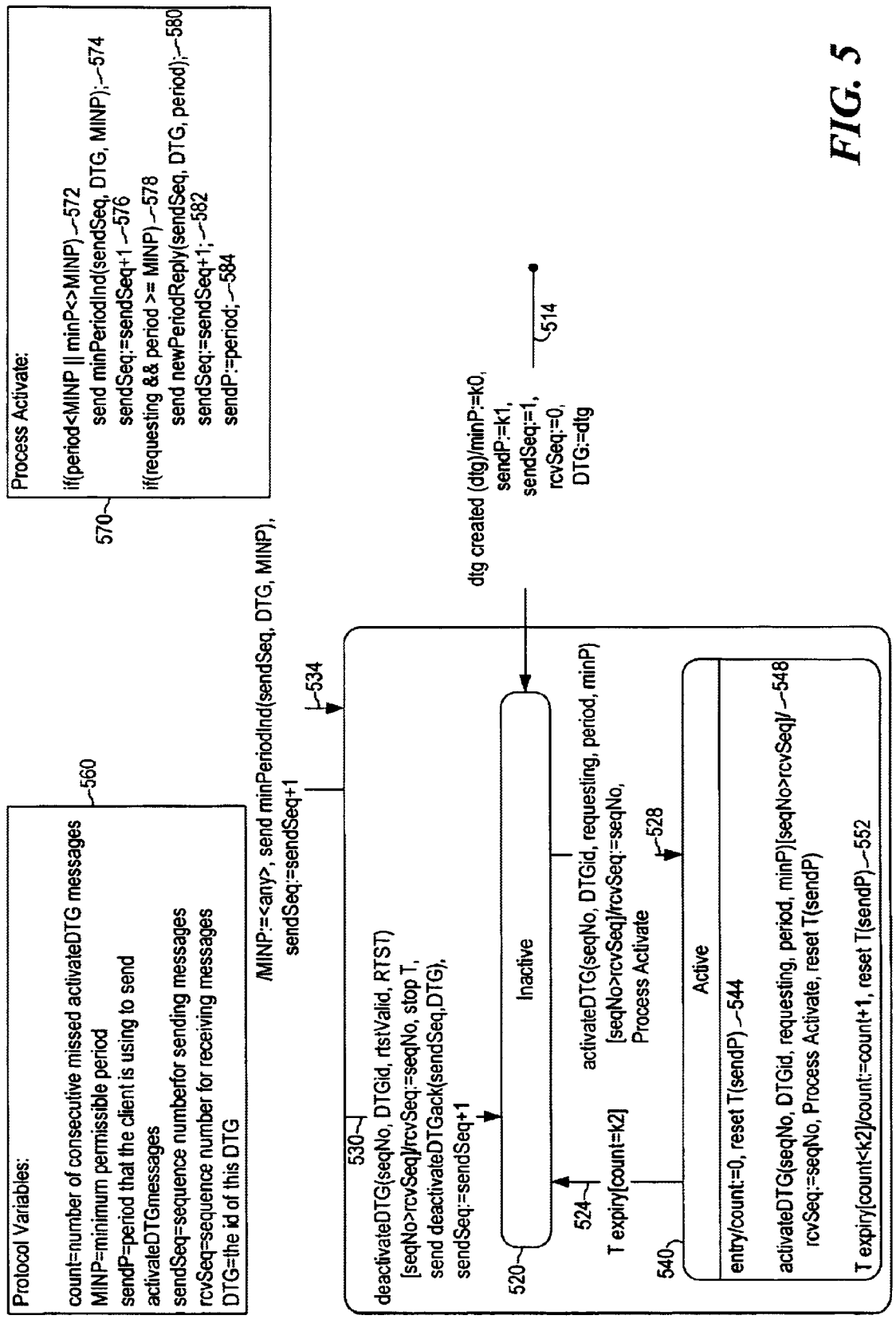
FIG. 5 is a Unified Modeling Language (UML) state diagram describing the behavior of a client computer and the heartbeat protocol.

FIGS. 5 and 6 describe a preferred behavior of the heartbeat protocol using Unified Modeling Language (UML) state diagrams which define each participant's execution of the protocol in terms of actions taken when protocol messages are received by the participant.

Accordingly, FIG. 5 provides a UML state diagram which defines the execution of the heartbeat protocol by a server, such as, for example, the server 30 (FIG. 1). The key for the state diagram is provided by block 560. This key describes the protocol variables that are maintained by the server during execution of the protocol. The variable count represents the number of consecutive times that a timer has expired since the last activateDTG message was received; MINP represents the minimum acceptable period of time that the client may use for sending activateDTG messages to the server; sendP represents the period of time that the client tells the server it is using for the transmission of activateDTG messages; sendSeq stores the value sent as the seqNo field of all messages; rcvSeq records the highest value in the seqNo field of any message received by the server; and DTG contains the value of the identifier for the DTG of the protocol.

For each DTG, a heartbeat server maintains an Inactive state 520 and Active state 540. It also maintains a timer (T) and the protocol variables defined above.

Each message received by the server is checked to determine whether the DTGid parameter matches an identifier for any of the DTGs that have been created as indicated by transition 514. If this is the case, the seqNo field of the message is checked against the rcvseq protocol variable for the DTG. If the seqNo field is not greater than this protocol variable, the message is discarded. Otherwise, the appropriate action is taken as described below.

When the server receives an activateDTG message, it unconditionally changes the state of that DTG to Active, as shown by transition 528, state 540, and transition 548. In step 544, it also resets the timer for that DTG and sets the value of count to zero. In the pseudo code 570, it then behaves according to the following logic: In step 572, a determination is made whether the period parameter of the activateDTG message is less than the protocol variable MINP, or whether the minP paramter of the activateDTG message is not equal to the protocol variable MINP. If either of the two conditions tested in step 572 is true, then steps 574 and 576 are executed. In step 574, a minPeriodInd message is sent to the client with the seqNo parameter set to the value of the protocol variable sendSeq, and the DTGid parameter set to the value of the protocol variable DTG, and the minP paramter of the message set to the value of the protocol variable MINP. In step 576, the server increments the value of the sendseq variable by one.

In step 578, the server determines whether the requesting parameter of the activateDTG message is true and whether the period parameter of this message is not less than the protocol variable MINP. If in step 578, both conditions are true, then steps 580, 582, and 584 are executed. In step 580, a newPeriodReply message is sent to the client with the seqNo field set to the value of the protocol variable sendSeq, the DTGid parameter of this message set to the value of the protocol variable DTG, and the newPeriod parameter of this message set to the value of the period paramter of the activateDTG message. In step 582, the server increments the value of sendSeq by one. In step 584, the server sets the protocol variable sendP to the value of the period parameter of the activateDTG message.

If the timer expires as shown at 552, the value of count is checked. If the value of count is less than some arbitrary protocol constant k2, then the value of count is incremented by one. Otherwise, the state of the resource record group identified by the protocol variable DTG is set to Inactive, as indicated by the transition 524 and the state 520.

If at any time as shown by transition 530, a deactivateDTG message is received, a deactivateDTGack message is sent to the client.

If at any time it is determined that the minimum permissible period the client may use to send activateDTG messages must change, a minPeriodIndication message is sent to the client, as shown by transition 534.

FIG. 6 provides a UML state diagram which defines the execution of the heartbeat protocol by a client, such as, for example, the computer 52 (FIG. 1).

Block 660 provides the key which summarizes first and second user primitives, and the protocol variables. The first user primitive, UPR, is a method invoked locally on the client in which a human user requests that the client change the period it uses to send activateDTG messages to the server. The UPR primitive has one parameter, which identifies the requested value for the new heartbeat period. The second user primitive, UDR, is a request by the human user for the client to notify the server that the DTG should be placed in the inactive state. The UDR primitive has two parameters, namely, rtst_valid and rtst. The rtst_valid parameter is a Boolean value indicating whether to interpret the second message parameter rtst. The second parameter represents the return-to-service time for the DTG.

The client protocol variables are requesting, curP, reqP, MINP, sendseq, rcvseq, and DTG, sendseq, rcvseq, and DTG have the same semantics as their identically named counterparts in the server. curP is the period the client is currently using to send activateDTG messages to the server. reqP is the value of the last valid requested period from a previous UPR primitive. MINP is the last value of the minP parameter in a minPeriodInd message received from the server. MINP represents the minimum period that the client may use when sending activateDTG messages to the server.

As shown by transition 614, the initial value of MINP and curP are set to protocol constants k0 and k1, respectively; sendseq and rcvSeq are initialized to 1 and 0, respectively; DTG is set to the value of the DTG identifier for the DTG; an initial activateDTG message is sent to the server; the timer T is set to the value of the protocol variable curp so that the timer T will expire in curP seconds from the time DTG is created; the value of sendSeq is incremented by one; and the PeriodRequest Acknowledged state 620 is entered.

The client may be in one of three states known as PeriodRequestAcknowledged state 620, RequestingNewPeriod state 640, and Deactivating 632.

In the PeriodRequestAcknowledged state 620, the client behaves as described below.

When the timer T expires, the client sends an activateDTG message with requesting, period, and minp parameters set to the values true, curP, and MINP, respectively, as shown by transition 622. It then resets the timer T to expire in curp seconds from the time that transition 622 occurs. When the client receives a minPeriodInd message, as shown by transition 624, the client sets the value of its protocol variable curP to the maximum of curp and the minp parameter of the message. It then sets the value of MINP to the value in the parameter minp. When the client receives a UserPeriodRequest in which the requested period is less than the value of MINP, as shown by the transition 634, the client responds to the human user, indicating it will not change the period being used for transfer of acitvateDTG messages. When it receives a UserPeriodRequest (UPR) in which the requested period is not less than MINP, and is equal to curP, the request is ignored, as shown by the transition 626. When the client receives a newPeriodReply message, it ignores the message as shown by transition 625. When the client receives a UPR in which the requested period is not less than MINP, and is not equal to curP, the client sets reqp to the requested value; it sends an activateDTG message to the server with parameters requesting, period, and minP set to the values true, reqP, and MINP, respectively; it resets the timer T to the lesser of the time remaining before the timer T expires, and the protocol constant k3; and finally, it enters the state RequestingNewPeriod. This is shown by transition 628 and state 640. When the client receives a UserDeactivateRequest (UDR), it enters the state Deactivating, as shown by transition 638 and state 632. As indicated by the step 636, upon entry to this state 632, the client sends a deactivateDTG message to the server, with the parameters rtstValid and RTST set to the analagous parameters of the UDR. It also resets the timer T to expire in k4 seconds, where k4 is a protocol-defined constant.

When the client is in the RequestingGreaterPeriod state 640, it behaves as described below.

When the timer expires, as shown by the transition 644, the client sends an activateDTG message and resets the timer T in substantially the same manner as describe above in 628. When the client receives a minPeriodInd message from the server in which minP is less than the protocol variable reqP as shown by transition 646, the client sets the values of curP an MINP in exactly the same manner as described in transition 624. When the client receives a minPeriodInd message from the server in which minp is not less than reqP, as shown by the transition 648, then the client behaves exactly as in 646, except that the client also enters the state PeriodRequestAcknowledged shown by state 620. When the client receives a UPR in which the requested period is not less than MINP, as shown by transition 650, the client sets reqP to the value requested. When the client receives a UPR in which the requested period is less than MINP, shown by transition 634, the client behaves exactly the same as described in the PeriodRequestAcknowledged state. When the client receives a newPeriodReply from the server in which the newPeriod parameter is not equal to reqP, shown by the transition 652, the client ignores this message. When the client receives a newPeriodReply from the server and the newPeriod parameter is equal to reqP, as shown by transition 654, then the client sets curP to the value of newPeriod; it resets the timer T to the new value of curp; and it enters the state PeriodRequestAcknowledged. When the client receives a UDR, the client behaves exactly as it does in the transition 638, state 636, and step 632 described above.

When the client is in the Deactivating state 632, it behaves as described below.

When the timer T expires in transition 639, it sends a deactivateDTG message to the server and resets the timer T to a protocol constant k4, as shown in step 636. When the client receives a deactivateDTGack message from the heartbeat server in transition 699, the heartbeat protocol terminates.

By the use of the present invention as shown in FIGS. 1–6, once a name server is able to determine whether or not network resources referenced by its resource records are available, it can then give a negative response to a client issuing a query for resources that are not available. A negative response from DNS for a resource that is not connected to the Internet has the advantage of more quickly informing the client that the resource being queried is unavailable. Furthermore, a name server can provide additional information in the response to the query, such as a text message that can give information to the client, or an indication of when the resource is expected to again become available.

It is understood that the present invention can take many forms and embodiments. Accordingly, several variations may be made in the foregoing without departing lid from the spirit or the scope of the invention. For example, the heartbeat protocol may be enhanced by configuring the server to send a challenge message to the client prior to determining that the client's network is disconnected, and requiring the client to respond to a challenge. This prevents the server from incorrectly determining that the client DTG is disconnected as a result of the chance loss or corruption of a few consecutive heartbeat messages by the network.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

What is claimed is:

1. A method for implementing a heartbeat protocol, comprising:

sending, directly to one or more selected servers, heartbeat messages from a single selected computer, indicating the availability of computer resources on one or more computers in a network associated with the single selected computer, such that loss of heartbeat messages from the single selected computer is indicative that all computer resources on the one or more computers are unavailable, and the presence of a heartbeat from the single selected computer is indicative that all computer resources are available;

generating a message by the single selected computer in accordance with the heartbeat protocol to indicate availability status of the one or more computer resources;

transmitting the message that indicates unavailability of the one or more computer resources by the single selected computer before a predetermined downtime; and receiving an acknowledgement of the unavailability message from the one or more servers to the single selected computer.

2. The method of claim 1 further comprising the step of the single selected computer requesting a new heartbeat rate, and upon agreement by the one or more selected servers to the new heartbeat rate, implementing the new heartbeat rate.

3. The method of claim 1 further comprising the step of the one or more selected servers imposing at any time a maximum rate at which the single selected computer may send heartbeats.

4. A method for implementing a heartbeat protocol, comprising: sending, directly to one or more selected servers, heartbeat messages from a single selected computer, indicating the availability of computer resources on one or more computers in a network associated with the single selected computer, such that loss of heartbeat messages from the single selected computer is indicative that all computer resources on the one or more computers are unavailable, and the presence of a heartbeat from the single selected computer is indicative that all computer resources are available;

generating a message by the single selected computer in accordance with the heartbeat protocol to indicate availability status of the one or more computer resources;

transmitting the message that indicates unavailability of the one or more computer resources by the single selected computer before a predetermined downtime; and generating an acknowledgement of unavailability message by the one or more servers to the single selected computer.

5. A method for implementing a heartbeat protocol, comprising:

directly receiving heartbeat messages sent by a single selected computer to one or more selected servers in a network associated with the single selected computer, the heartbeat messages indicating the availability of resources on one or more computers, such that loss of heartbeat from the single selected computer is indicative that all computer resources are unavailable, and the presence of a heartbeat from the selected computer is indicative that all computer resources are available;

generating a message by the single selected computer in accordance with the heartbeat protocol to indicate availability status of the one or more computer resources;

determining from the presence or absence of the heartbeat messages that all computer resources are available or unavailable, wherein acknowledgements of unavailability to computers that indicate unavailability are provided;

transmitting the message that indicates unavailability of the one or more computer resources by the single selected computer before a predetermined downtime; and providing a response to a message query for the computer resources for which the heartbeat is absent that the computer resources are unavailable.

6. The method of claim 5, further comprising additional information associated with the response to the message query concerning the computer resources.

7. The method of claim 6, wherein the additional information provided comprises a text message.

8. The method of claim 5, further comprising providing additional information associated with the response to the message query concerning when the computer resources are expected to become available.

9. The method of claim 5, wherein the heartbeat is monitored by a primary master name server for a zone of communications network comprising the computer resources.

10. The method of claim 5, wherein the heartbeat is generated by at least one computer within a domain name zone.

11. A method for implementing a heartbeat protocol comprising: sending, directly to one or more selected servers, heartbeat messages from a single selected computer, indicating the availability of computer resources on one or more computers, such that loss of heartbeat messages from the single selected computer in a network associated with the single selected computer is indicative that all computer resources on the one or more computer are unavailable, and the presence of a heartbeat from the single selected computer is indicative that all computers are available;

generating a message by the single selected computer in accordance with the heartbeat protocol to indicate the availability status of the one or more computer resources; and transmitting the message to the one or more selected servers before a predetermined downtime, wherein acknowledgements of unavailability to computers that indicate unavailability are provided.

12. A method for implementing a heartbeat protocol, comprising:

directly receiving heartbeat messages sent by a single selected computer to one or more selected servers in a network associated with the single selected computer, the heartbeat messages indicating the availability of resources on one or more computers, such that loss of heartbeat from the single selected computer is indicative that all computer resources are unavailable, and the presence of a heartbeat from the selected computer is indicative that all computer resources are available;

generating a message by the single selected computer in accordance with the heartbeat protocol to indicate availability status of the one or more computer resources;

transmitting the message to the one or more selected servers;

determining from the presence or absence of the heartbeat messages that all computer resources are available or unavailable, wherein acknowledgements of unavailability to computers that indicate unavailability are provided;

transmitting the message that indicates unavailability of the one or more computer resources by the single selected computer before a predetermined downtime; and providing a response to a message query for the computer resources for which the heartbeat is absent that the computer resources are unavailable.

* * * * *